United States Patent
Levinson

(10) Patent No.: US 7,819,328 B2
(45) Date of Patent: Oct. 26, 2010

(54) OPTICAL IDENTIFICATION CHIPS

(75) Inventor: Frank Levinson, Syracuse, IN (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/413,878

(22) Filed: Apr. 27, 2006

(65) Prior Publication Data

US 2006/0248576 A1   Nov. 2, 2006

Related U.S. Application Data

(60) Provisional application No. 60/675,679, filed on Apr. 28, 2005.

(51) Int. Cl.
    *G06K 19/06*  (2006.01)
(52) U.S. Cl. ............... 235/492; 340/10.1; 340/505; 726/1
(58) Field of Classification Search .......... 235/454, 235/492; 340/10.1, 10.5, 505; 705/64; 726/1
    See application file for complete search history.

(56) References Cited

U.S. PATENT DOCUMENTS

| 5,789,733 | A | 8/1998 | Jachimowicz | |
| 2003/0172037 | A1* | 9/2003 | Jung et al. | 705/64 |
| 2003/0222208 | A1 | 12/2003 | Guenter et al. | |
| 2004/0243528 | A1* | 12/2004 | Austin | 706/1 |
| 2005/0040241 | A1 | 2/2005 | Raskar | |
| 2005/0116813 | A1* | 6/2005 | Raskar | 340/10.1 |
| 2005/0158940 | A1* | 7/2005 | Lee et al. | 438/216 |
| 2006/0065732 | A1 | 3/2006 | Barkan | |
| 2006/0146904 | A1* | 7/2006 | Guenter et al. | 372/50.124 |
| 2006/0213904 | A1* | 9/2006 | Kates | 219/702 |
| 2006/0248576 | A1* | 11/2006 | Levinson | 726/1 |
| 2006/0261926 | A1* | 11/2006 | Zimmerman et al. | 340/10.1 |
| 2007/0127865 | A1* | 6/2007 | Lu et al. | 385/14 |

* cited by examiner

*Primary Examiner*—Allyson N Trail
(74) *Attorney, Agent, or Firm*—Workman Nydegger

(57) ABSTRACT

An optical identification element. The optical identification element is associated with an object and includes encoded or stored information associated with the object. The optical identification element includes an optical assembly that generates electrical power in response to incident light from a reader. The generated electrical power is used by the optical identification element to at least retrieve the data and then transmit the data back to the reader optically.

21 Claims, 1 Drawing Sheet

OPTICAL IDENTIFICATION CHIPS

CROSS REFERENCE TO RELATED APPLICATIONS

This application claims the benefit of U.S. Provisional Application Ser. No. 60/675,679 filed Apr. 28, 2005, which application is hereby incorporated by reference in its entirety.

BACKGROUND OF THE INVENTION

1. The Field of the Invention

This invention relates to identification systems. More specifically, embodiments of the invention relate to optical identification elements that receive incoming optical signals and transmit outgoing optical signals that contain identification information.

2. Background and Relevant Art

Radio frequency identification (RFID) is a relatively new technology that, in recent years, has been widely adopted in a variety of applications, and is helping to revolutionize how consumers shop, how inventory is managed, and even how we keep ourselves, our children and our communities safe and secure.

Radio frequency identification operates by embedding a silicon chip (i.e., a "RFID chip") into the fabric, skin or packaging of the device or physical item to be tracked or identified. Once the RFID chip is in place, a reasonably strong radio frequency (RF) beam is emitted, typically in the range of 1 GHz. The RF beam in effect surrounds the device, and energy from the beam is used to temporarily power or energize the RFID chip. As the RFID chip is energized, the chip eventually (typically in a fraction of a second) sends out its own RF beam back to a receiver, again typically in the range of about 1 GHz. The RF signal transmitted from the energized RFID chip includes encoded data, which permits identification information to be received by the receiver. In general, the RF signal emitted from the RFID chip can be used to verify the presence or existence of a device tagged with an RFID chip, to identify the physical location of the tagged device, to obtain information stored in the RFID chip, or to perform a combination of these operations.

One of the drawbacks of RFID systems relates to security. In many RFID systems, security and privacy is a concern because the RFID chips can be read using radio devices. When using RFID devices, users do not always have control over when the RFID chip is read or necessarily have the ability to prevent others from reading the RFID chip.

BRIEF SUMMARY OF THE INVENTION

These and other limitations are overcome by embodiments of the invention, which relate to optical identification systems. An optical identification (ID) element can be embedded into or connected to the fabric, skin or packaging of an object. The optical ID element is optically read and can be adapted for use with different frequencies.

In one embodiment, an optical ID element is used for tracking information associated with an object. The optical ID element includes a first chip with an optical assembly. The optical assembly generates a voltage in response to incident light from a reader. The optical assembly also includes a light emitting element that can be used to convey data to the reader. A second chip provides data management for information stored in the second chip and the reader collects the information from the data management. The power generated by the incident light enables the optical ID element to optically transmit the encoded and/or stored data back to the reader.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
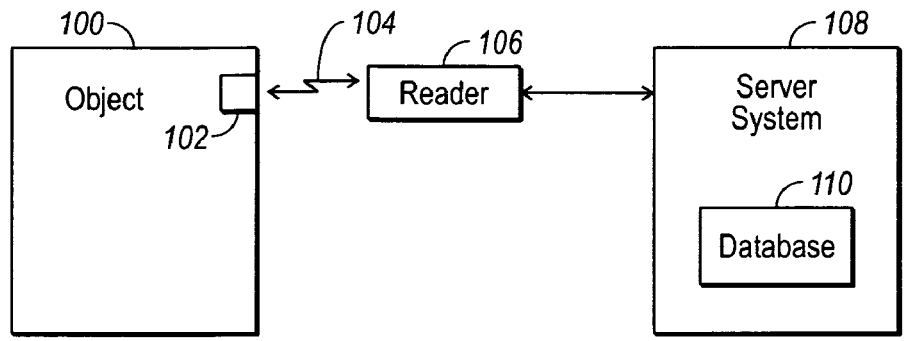
FIG. 1 illustrates an exemplary environment for implementing embodiments of the invention.

The present invention relates to identification devices that operate in the optical domain (e.g., in the visual or in the IR or other near-visual portions of the spectrum) and can be used to perform most of the functions conventionally performed by RFID systems, as well as be applied to new applications. The basic optical identification device includes two chips that are stacked together to form a single element. The resulting optical identification element (hereinafter "optical ID element") can be as small as 1 mm$^3$ or smaller, and as basic semiconductor processes continue to improve, can in the future be adapted to be much smaller.

One of the two chips is a pure complementary metal oxide semiconductor (CMOS) device that manages the identification information, receives data from incoming optical signals, and provides data that is to be encoded in outgoing optical signals. The CMOS chip interfaces with the other chip, which, in one embodiment, is an optical device that includes 1) a photodetector that receives light to locally create energy and to receive data, if it has been sent, and 2) a vertical cavity surface emitting laser (VCSEL) that can generate and transmit an optical signal.

The optical device that is part of the optical ID element is a semiconductor chip that, as noted above, includes both a photodiode and a laser. During operation, the photodetector receives an incoming signal (e.g., an IR beam emitted by a reader device). The incoming signal, under the photovoltaic effect, generates current in the photodiode of the optical device that is sufficient to provide electrical power for the CMOS chip and to provide electrical power to bias the laser included in the optical device. Thus, the incoming signal received by the photodetector is converted to electrical energy that powers the optical ID element.

The optical ID elements of the invention have several advantages compared with conventional RFID chips. For example, communicating with RFID chips requires specialized RF transmission and receiver equipment. In contrast, there are already in existence tens or hundreds of millions or more devices that can be conveniently adapted to operate as ID readers that can operate with the optical ID elements of the invention. Moreover, it is likely that these devices will be even more common in the coming years.

In particular, many existing mobile telephones, personal digital assistants, and other portable or wireless devices include ports that operate using the Infrared Data Association standards (i.e., "IRDA ports"). The optical ID elements of the invention can be adapted to operate on the infrared frequencies used by the IRDA ports of these existing devices. This feature of the invention can be leveraged to enable vast numbers of existing and future devices to perform substantially any functions previously performed only by RFID systems with specialized equipment, as well as numerous other functions. For instance, existing mobile telephones can become optical ID element receivers that can check prices of goods in stores, purchase goods, identify counterfeit goods, etc.

In addition, the cost of obtaining optical ID elements is generally competitive with the cost of RFID chips. Because the receivers and transmitters in the transceiver chip of the optical ID elements are used only infrequently for very short periods of time, the quality and longevity of the receiver and transmitter elements do not need to meet the standards that currently exist for communication and data network optical transceivers that are used sometimes continuously for long periods of time.

Because the optical ID elements generally operate only when they are visible to the ID receivers, the optical ID elements can be placed in packages that are transparent to the optical wavelength (e.g., infrared) associated with the signals received by and emitted from the optical ID elements. Similarly, however, conventional RFID devices operate generally only in devices that are transparent to RF wavelengths. The overall chip package of the optical ID elements of the invention can be small and molded.

In addition, the optical ID elements of the invention address and overcome many of the privacy concerns associated with conventional RFID chips. Because the optical ID elements of the invention operate in the visible portion of the electromagnetic spectrum, or in adjacent regions, such as infrared, it is generally relatively easy for those who possess devices tagged with the optical ID elements to know whether they can be read. In particular, if an optical ID element of the invention is not visible to the eye, it generally will not be read (i.e., cannot be read by unauthorized individuals). Thus, those who possess tagged devices can know when the ID elements can be read and can decide when the devices are to be read (i.e., by making the optical ID elements visible). Moreover, the optical ID elements can be programmed and changed. Strong encryption is possible with the optical ID elements, and they can be used as platform for tagging devices in a networked environment for purposes other than simply ID tracking.

The Figures more fully illustrate embodiments of the invention. FIG. 1 illustrates a suitable environment for implementing embodiments of the invention. In this example, an optical ID element 102 has been attached to an object 100. The optical ID element 102 can be attached to the packaging of the object, skin, or other aspect of the object 100. In order to be read, the optical ID element 102 should be visible at least to the reader. The optical ID element 102, for example, could be molded over using a material that is transparent to the light used in communication with the optical ID element 102.

The optical ID element 102 is activated by a reader 106 using light 104. As described previously, the light 104 may be generated from IRDA ports of many devices including cellular telephones and personal digital assistants. The optical ID element 102 can be formed such that the wavelength of the light 104 emitted by the reader 106 activates the optical components of the optical ID element 102.

The common availability of IRDA ports on many devices ensures that readers are readily available. In addition, embodiments of the invention can take advantage of the capabilities of these readers. Cellular telephones, for example, can be used to place telephone calls that use the collected data to verify or authenticate an object.

The information stored by the optical ID element 102 and retrieved by the reader 106 can be used to track and update inventory data. The information stored on the optical ID element 102, however, is not necessarily limited to inventory data. For example, the data stored by the optical ID element 102 can include price data, verification data, counterfeit protection data, sale restriction data, and the like. When the reader 106 is a cellular telephone, for instance, the retrieval of data from the optical ID element 102 can include a telephone number and an encrypted identifier that can be used to verify the authenticity of the object 100.

More generally, the optical ID element 102 may further include additional sensors that have the ability to store data. For example, a temperature sensor may be incorporated and periodically read such that the temperature data can also be read by the reader 106. The power for the sensor incorporated into the optical ID element 102 can be from a battery, or as described below, from the optical ID element itself when optical energy of the appropriate frequency is incident on the optical ID element 102. The inclusion of additional sensors may be application dependent and/or cost dependent as well. The data obtained from the optical ID element 102 by the reader 106 may also be encrypted.

Once information has been collected by the reader 106, the reader 106 may transmit the data to a server system 108, which may update a database 110 based on the collected data, access the database for additional information based on the collected data, and the like or any combination thereof. In an inventory scenario, the optical ID element 102 may be read during a sale or during delivery of the product, which results in an update to the inventory database 110. A price scan, on the other hand, may collect information used to obtain the current price from the database 110.

The communication between the reader 106 and the server system 108 can occur using wireless networks (WiFi, cellular RF networks, Bluetooth, etc.) Also, the reader 106 may store the collected data, which is then downloaded at a later time to the server system 108. Thus, a reader can be used to collect data from multiple optical ID elements before transmitting the collected data. In one example, a cellular telephone may have access to the optical ID element 102 to check the price of the object 100, while only a reader 106 that has authority can use the collected information to update inventory. This expands the use of the optical ID element 102 while still providing protection and controlling access to the data stored by the optical ID element 102. Thus, the light emitted by the reader can also include codes or encrypted data that can be used to authenticate the reader or to determine the permissions of the reader 106. In this manner, the data stored by the optical ID element can be read only when authorized and privacy concerns can be ameliorated.

Figure 2:
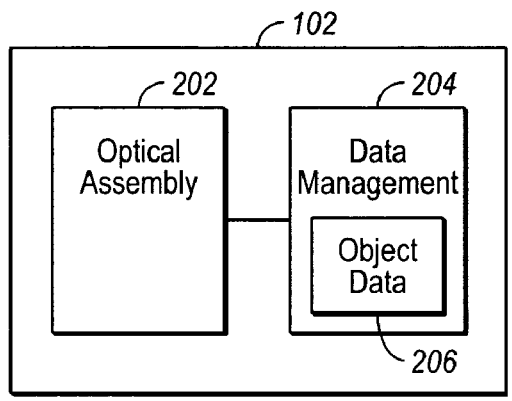
FIG. 2 illustrates one embodiment of an optical identification element that includes an optical assembly chip and a data management chip.

FIG. 2 illustrates another embodiment of the optical ID element 102. The optical ID element 102 includes an optical assembly 202 and a data management system 204. The optical assembly 202 typically includes semiconductor elements such as photodiodes that generate current in response to incident light. The optical assembly 202 may also include semiconductor elements such as vertical cavity surface emitting lasers (VCSELs) that have the ability to generate light under the proper voltages.

Thus, the light generated by a reader and incident on the optical assembly 202 generates voltage and current that can be used by the data management 204. As previously indicated, the incident light can also be modulated to verify access and/or program the data management 204. Using the provided power from the optical assembly 202, the data management may access the object data 206 and transmit the object data using the light transmitting aspect of the optical assembly 202. The data management 204 is, in one embodiment, a CMOS device or chip that manages information and signals.

The data management 204, when receiving power (in the form of voltage and/or current) from the optical assembly 202, can generate the signals needed to convey information to the reader 106, access encoded data, write to memory, and the like or any combination thereof. The data can be conveyed to a reader 106 by modulating a light generating device included in the optical assembly. In this case, the optical assembly also includes a VCSEL or other light emitting device that can be powered by the current or voltage generated in response to input light from the reader 106. The data management 204 can connect with the optical assembly 202 in a manner that permits the light to be modulated and thus collected by the reader 106. Alternatively, the data management 204 may include sensors as well as RF components that can be activated via the reader 106 as described above.

Figure 3:
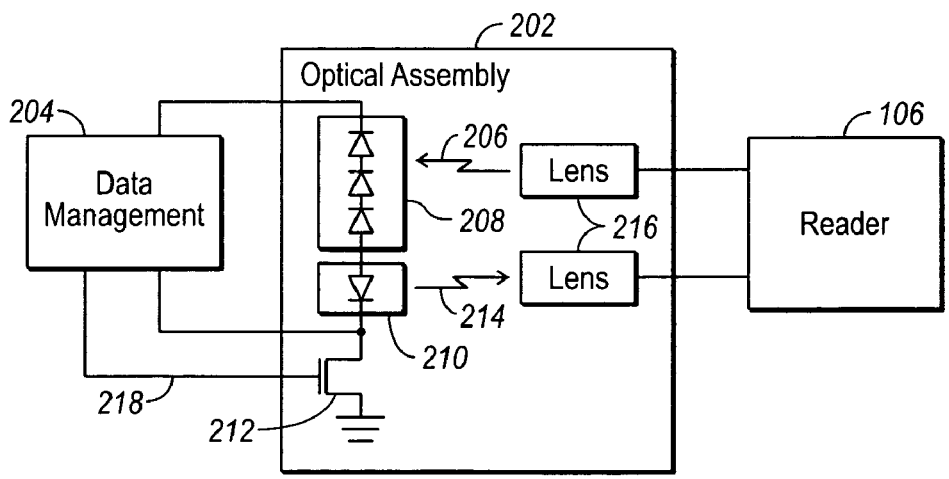
FIG. 3 illustrates another embodiment of an optical assembly chip that communicates with a reader using light signals at particular frequencies.

FIG. 3 illustrates an embodiment of the optical assembly 202 connected with a data management 204. The optical assembly includes a semiconductor device including a laser 210 and photodiodes 208. The light 206, which may be in a wavelength associated with IFRD, is generated by the reader 106 and may be focused by a lens 216 onto the photodiodes 208. In response to the light 206, the photodiodes can generate current and voltage needed to power the data management 204.

The voltage generated by the photodiodes 208 may also bias the laser 210 such that the laser 210 emits light 214 that may be focused by the lens 216 and read by the reader 106. The data management 204 can generate a control signal 218 that controls the transistor 212. The ability to control the state of the transistor 212 enables the light 214 emitted by the laser 210 to be modulated. This is one illustration of how a reader can collect information from an optical ID element. Examples of optical devices that can provide the functions described above and that can be used in optical ID elements according to the invention are described and illustrated in U.S. Patent Application Publication No. US 2004/0208600 A1 and U.S. Patent Application Publication No. US 2003/0223756 A1, which are both incorporated herein by reference.

The optical ID element 102 can be integrated into a single IC (integrated circuit) or can be implemented using two ICs. Further, the optical assembly, including the photodiodes and laser, can be a monolithic structure. The wavelength generated by the laser 210 can be the same as or different from the wavelength used by the photodiodes 208 to generate current.

Advantageously, a user can control when the optical ID elements are read, and other users cannot read the optical ID element without the user's knowledge.

The optical ID element 102 can be very small. For example, the optical ID element 102 can be placed inconspicuously into jewelry (e.g., watches and the like) and used to foil counterfeiters. Even assuming that a counterfeiter could place a chip into the counterfeit jewelry, the chip would be very unlikely to have the numbers needed to authenticate the corresponding jewelry. A purchaser could use their cell phone to read the optical ID element and verify the dialog with a watch by placing a call or SMS message to a server at the manufacturer to verify authenticity.

Embodiments of the invention can also be practiced where the VCSEL and the photodiodes are separate and not a monolithic structure. CMOS structures can be very small (currently on the order of 45 nanometers for the next node). As a result, a single silicon cell on the chip could provide the power and only a VCSEL is needed to complete the overall device. The photodiode/Rx could be integrated on the CMOS chip itself. For a 45 nanometer, a chip likely needs on the order of 0.45 Volts for operation and about 0.5 Volts is generated in a single Si photocell.

The present invention may be embodied in other specific forms without departing from its spirit or essential characteristics. The described embodiments are to be considered in all respects only as illustrative and not restrictive. The following claims are presented to illustrate various novel features of the present invention. The claims are not exhaustive of the embodiments of the invention, nor are they to be construed as limiting the scope of the invention. Moreover, the invention disclosed in detail herein can be defined with other claims, including those that will be included in any related non-provisional applications that will be filed during the pendency of this application.

I claim:

1. An optical identification element, comprising:
   a first chip that includes identification information and responds to signals that request the identification information; and
   a second chip in communication with the first chip, the second chip including:
   an optical receiver that receives incoming optical signals from an identification reader device; and
   an optical transmitter that transmits outgoing optical signals containing the identification information provided by the first chip,
   wherein the outgoing optical signals includes light in a region of the electromagnetic spectrum that is invisible to human observation.

2. The optical identification element of claim 1, wherein the optical transmitter comprises a VCSEL.

3. The optical identification element of claim 1, wherein the optical signals are in the infrared region of the electromagnetic spectrum.

4. The optical identification element of claim 3, wherein the optical receiver and the optical transmitter are adapted to communicate with an infrared port of an identification reader device.

5. The optical identification element of claim 4, wherein the identification reader device is one of a mobile telephone and a personal digital assistant that includes the infrared port.

6. The optical identification element of claim 1, wherein the second chip:
   provides electrical power to the first chip to permit the first chip to operate; and
   provides an electrical signal to the first chip to request the identification information that is encoded on the first chip.

7. The optical identification element of claim 6, further comprising a sensor that receives electrical power from the second chip.

8. A method of using the optical identification element of claim 1, to provide the identification information to the identification reader device, comprising:

receiving an incoming optical signal from the identification reader device that includes a request for the identification information; and transmitting an outgoing optical signal to the identification reader device that includes the requested identification information.

9. The optical identification element of claim 1, wherein the first chip is a 45 nanometer CMOS chip.

10. In a system that tracks information associated with objects, an optical identification element for use in tracking the information, the optical identification element comprising:

a first chip including an optical assembly, the optical assembly generating electrical power in response to incident light, wherein the optical assembly further comprises a light emitting element; and a second chip that provides data management for information stored in the second chip, wherein a reader collects the information from the second chip by generating the incident light, wherein the light emitting element of the optical assembly is configured to emit light at an infrared frequency.

11. The optical identification element of claim 10, wherein the optical assembly further comprises:

a semiconductor structure that includes a plurality of photodiodes that generate current in response to a first wavelength of the incident light and wherein the light emitting element is included in the semiconductor structure and comprises a laser that emits light at a second wavelength.

12. The optical identification element of claim 11, wherein the first wavelength and the second wavelength are substantially the same wavelength.

13. The optical identification element of claim 11, the semiconductor structure further comprising a transistor that enables the second chip to modulate light emitted by the laser.

14. The optical identification element of claim 11, wherein the laser is a vertical cavity surface emitting laser and wherein the semiconductor structure is a monolithic structure.

15. The optical identification element of claim 11, wherein the data management includes reader authentication.

16. The optical identification element of claim 15, wherein the data provided to a reader is controlled by the data management by credentials of the reader that are modulated into the incident light.

17. The optical identification element of claim 11, wherein the data management provides the data to the reader by modulating the laser.

18. The optical identification element of claim 11, wherein the reader is one of a cellular telephone or a personal digital assistant.

19. The optical identification element of claim 18, wherein the reader calls an authentication service and uses the collected data to verify an object associated with the optical identification element.

20. The optical identification element of claim 11, wherein the plurality of photodiodes are arranged in a series connection.

21. The optical identification element of claim 10, wherein the optical assembly includes at least one photodiode that is integrated with a transmitting light element on a single chip.

* * * * *